July 28, 1970      A. A. RUNDEL      3,521,799
AUTO CARRIER
Filed Aug. 28, 1967
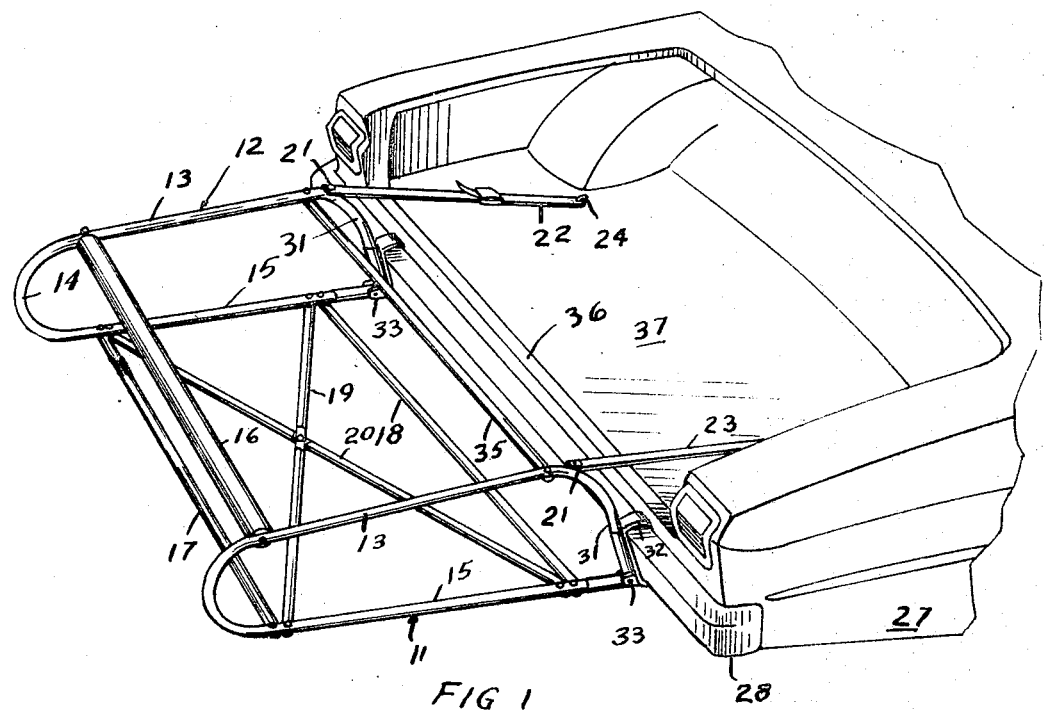
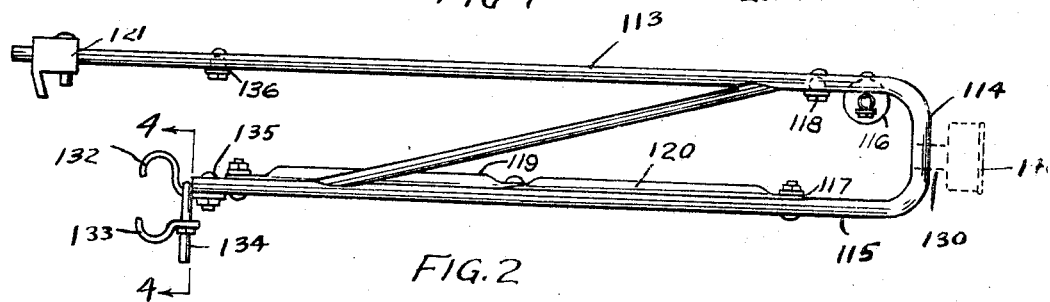
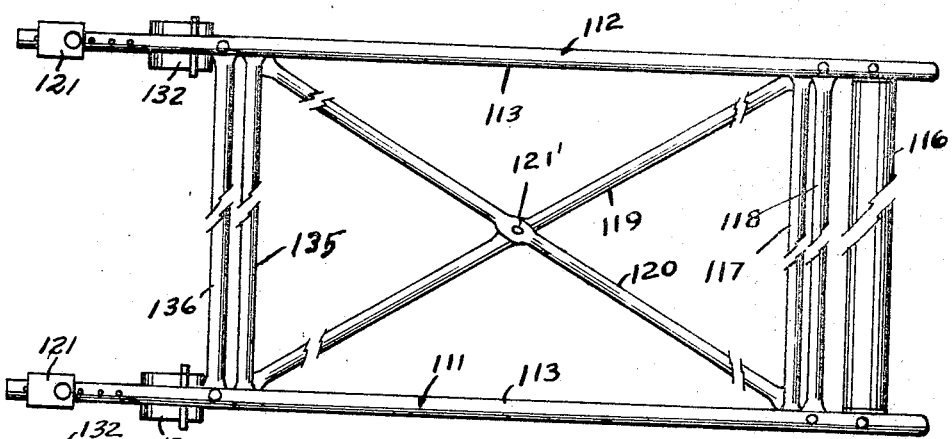
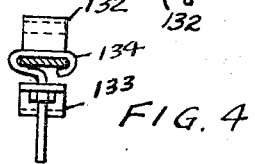
INVENTOR.
ALBERT A. RUNDEL
BY
Charles L. Lovercheck United States Patent Office 3,521,799
Patented July 28, 1970

3,521,799
AUTO CARRIER
Albert A. Rundel, R.D. 1, Saegerstown, Pa. 16433
Filed Aug. 28, 1967, Ser. No. 663,768
Int. Cl. B60r 9/06; B60p 3/10
U.S. Cl. 224—42.07                 5 Claims

ABSTRACT OF THE DISCLOSURE

The carrier disclosed herein is suitable for attaching to the rear bumper of an automobile at its front lower part. Its front top part is suitable for attaching to a member such as a strap attached to the floor of a trunk. The carrier extends rearward from the vehicle. It may be made of bent tubing. Each side of the carrier is made from a tube bent generally into the form of a rectangle. The spacers that separate the two sides may also be tubular. When the carrier is used for a boat, one of the spacers may be provided with a bearing at each end to form a roller which will facilitate movement of the boat onto the carrier.

---

This invention relates to carriers and, more particularly, to carriers for mounting on the rear end of a vehicle to carry a boat, luggage, or the like.

It is, accordingly, an object of the invention to provide an improved carrier for an automobile vehicle or the like.

Another object of the invention is to provide an automobile, luggage, and boat carrier, which is simple in construction, economical to manufacture, and simple and efficient to use.

Another object of the invention is to provide an automotive vehicle carrier which will extend outward from the rear end of a vehicle and is suitable to support a boat.

With the above and other objects in view, the present invention consists of the combination and arrangement of parts hereinafter more fully described, illustrated in the accompanying drawing and more patricularly pointed out in the appended claims, it being understood that changes may be made in the form, size, proportions, and minor details of the construction without departing from the spirit or sacrificing any of the advantages of the invention.

In the drawings:

FIG. 1 is an isometric view of one embodiment of the invention;

FIG. 2 is a side view of another embodiment of the invention similar to that shown in FIG. 1;

FIG. 3 is a top view of the embodiment shown in FIG. 2; and

FIG. 4 is a cross sectional view taken on line 4—4 of FIG. 2.

Now with more particular reference to the drawings, the carrier shown in the embodiment of FIG. 1 has a right side 11 and a left side 12. The sides have top rails 13, rear rails 14, bottom rail 15, and front rail 31. The carrier is made by providing the bumper attaching means or clamp means 32 attached to the front rail 31 and suitable to clamp onto a bumper 28 of an automotive vehicle as shown. The fastener 33 which may be a pin or rivet attaches the front rail 31 to the bottom rail 15. The bottom rail 15 is bent upwardly and forwardly forming a rear end and is bent forwardly, then it is bent downwardly to form a front rail 31. The sides are attached together by rods defining spacers 16, 17, 18, and 35 which constitute spacer means. It will be noted that the spacers 16 may be in the form of a roller supported on the sides 11 and 12 by a bearing at each end to make it easier to slide a boat over it. The spacer 16 and the spacer 35 are supported at approximately the same level as the rear end gate 36 of the automobile, which extends slightly above the floor 37 of the trunk.

The straps 22 and 23 are attached to the upper front part of the sides by rivets 21 and to the hooks 24 which are attached to the floor of the trunk. The cross braces 19 and 20 connect the two side members rigidly together, thus, a boat may be drawn over and supported on top of the spacer 16 which is in the form of a roller and the spacer 35 and the front end of the boat may rest on the floor 37 of the trunk of the automobile. The bumper of the vehicle is indicated at 28 and it may be of a conventional type used on automotive vehicles.

In the embodiment of the invention shown in FIG. 2, the side rails are made of the top rail 113 which is bent downwardly to form the rear rail 114 and forwardly to form the bottom rail 115 and the front end of the bottom portion is attached to the upper part 132 of the bumper hook. The lower part 133 of the bumper hook has a hole in it that receives the bolt 134 which has a suitable nut on it and bumper is received and clamped between the hook 132 and the hook 133. Hooks 132 and 133 comprise bumper attaching means. The hook 132 is attached to the bottom rail 115 by bolt 135. The cross braces 119 and 120 are connected together at a center by a bolt 121'.

The sides 111 and 112 are formed by the top rail 113 which is attached to the hook 121 at the front and is attached to rear rail 114, which is attached to bottom rail 115. The spacers 116 and 117, 118 and 135 and 136 are similar to the spacers shown in the embodiment of FIG. 1 and constitute spacer means between the sides 111 and 112. The spacer 116 is in the form of a roller and is supported in bearings at its ends and is suitable to move a boat thereover when it is being loaded on the carrier.

The foregoing specification sets forth the invention in its preferred practical forms but the structure shown is capable of modification within a range of equivalents without departing from the invention which is to be understood is broadly novel as is commensate with the appended claims.

The embodiments of the invention in which an exclusive property or privilege is claimed are defined as follows:

1. A carrier for attaching to the rear end of an automobile comprising
   two spaced side members defining sides to contain a load therebetween,
   spacer means connecting said side members rigidly together,
   said spacer means extending between said side members and attached to both said sides,
   clamp means attached to the front part of said side members at the lower portion thereof for attaching said side members to the rear bumper of an automobile,
   and means attached to the front of said side members adjacent the top thereof for attaching said side members to the floor of the trunk of said automobile,
   said side members are each made of a single tube attached to said means for attaching it to said bumper and extending rearwardly and defining a bottom edge of said side, then curved and extending upwardly and defining a rear of said sides,
   then extending forwardly defining a top edge of said sides terminating at said means for attaching to said floor of said trunk.

2. The carrier recited in claim 1 wherein said front end of said tube extends downwardly defining a front edge of said sides and attached to said means for attaching said side to said bumper.

3. The carrier recited in claim 2 wherein
   said means for attaching said front part of said side member to said bumper comprises a top clamp member in the form of an upper hook fixed to said side member and adapted to overlie and receive the top of a said bumper, a bolt attached to said top clamp and extending downward therefrom, and a lower hook adapted to receive a lower part of said bumper, a hole in said lower hook and said bolt extending through said hole.

4. The carrier recited in claim 1 wherein diagonal braces are each fixed to a said side member at their front ends, said braces extend diagonally across said side members and are attached thereto at the rear end of the opposite said side member.

5. A carrier for attaching to the rear end of an automobile comprising two spaced side members defining sides to contain a load therebetween, spacer means connecting said side members rigidly together, said spacer means extending between said side members and attached to both said sides, clamp means attached to the front part of said side members at the lower portion thereof for attaching said side members to the rear bumper of an automobile, and means attached to the front of said side members adjacent the top thereof for attaching said side members to the floor of the trunk of said automobile, said side members are each made of a single tube attached to said means for attaching it to said bumper and extending rearwardly and defining a bottom edge of said side, then curved and extending upwardly and defining a rear of said sides, then extending forwardly defining a top edge of said sides terminating at said means for attaching to said floor of said trunk, said carrier in combination with an automobile having a trunk with a floor and spaced sides, and said side members are attached to said floor, and said side members are spaced apart a distance substantially equal to the space between said sides.

References Cited

UNITED STATES PATENTS

| | | | |
|---|---|---|---|
| 2,541,244 | 2/1951 | Hack | 224—42.07 |
| 2,746,659 | 5/1956 | Caruolo | 224—42.07 |
| 2,771,231 | 11/1956 | Hare | 224—42.1 |

GERALD M. FORLENZA, Primary Examiner

R. J. SPAR, Assistant Examiner